US012572320B2

(12) United States Patent
Kapinos et al.

(10) Patent No.: US 12,572,320 B2
(45) Date of Patent: Mar. 10, 2026

(54) AUDIO STREAMING FUNCTION MANAGER

(71) Applicant: Lenovo (Singapore) Pte. Ltd., New Tech Park (SG)

(72) Inventors: Robert J. Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 593 days.

(21) Appl. No.: 17/863,057

(22) Filed: Jul. 12, 2022

(65) Prior Publication Data

US 2024/0020085 A1     Jan. 18, 2024

(51) Int. Cl.
*G06F 3/16*          (2006.01)
(52) U.S. Cl.
CPC .................................... *G06F 3/165* (2013.01)
(58) Field of Classification Search
CPC ...................................................... G06F 3/165
See application file for complete search history.

(56) References Cited

U.S. PATENT DOCUMENTS

| | | | | |
|---|---|---|---|---|
| 2006/0073795 A1* | 4/2006 | Mayblum | .............. | H04N 7/148 |
| | | | | 455/90.3 |
| 2008/0274764 A1* | 11/2008 | Masuda | .................... | H04B 1/44 |
| | | | | 370/276 |
| 2013/0109425 A1* | 5/2013 | Kerger | .............. | H04M 1/72469 |
| | | | | 455/518 |
| 2019/0158926 A1* | 5/2019 | Kang | ................. | H04N 21/4112 |
| 2022/0035594 A1* | 2/2022 | Kim | ........................ | G06F 3/165 |

* cited by examiner

*Primary Examiner* — Joseph Saunders, Jr.
(74) *Attorney, Agent, or Firm* — Kunzler Needham & Hilton

(57) ABSTRACT

Apparatuses, methods, systems, and program products are disclosed for enabling user-defined and user-controlled management of streaming audio. An apparatus includes a processor, and coupled to the processor, a memory that stores code executable by the processor to enable a user to selectively conjoin at least one control function for a first audio streaming component and a second audio streaming component and to enable the user to simultaneously control the first audio streaming component and the second audio streaming component with the at least one control function, and a user interface.

20 Claims, 5 Drawing Sheets

200

100

200

300

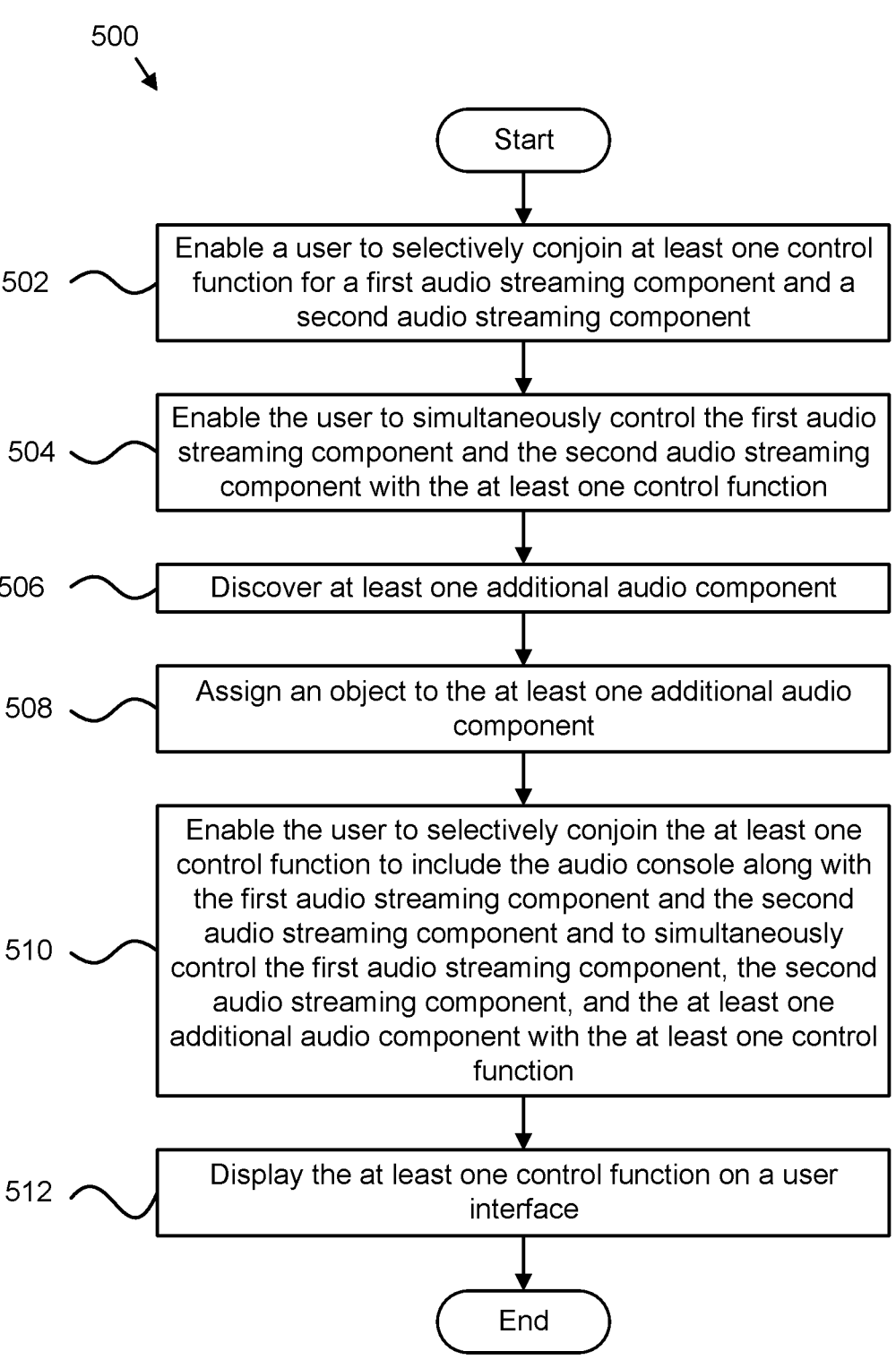

500

Start

502 — Enable a user to selectively conjoin at least one control function for a first audio streaming component and a second audio streaming component 504 — Enable the user to simultaneously control the first audio streaming component and the second audio streaming component with the at least one control function 506 — Discover at least one additional audio component 508 — Assign an object to the at least one additional audio component 510 — Enable the user to selectively conjoin the at least one control function to include the audio console along with the first audio streaming component and the second audio streaming component and to simultaneously control the first audio streaming component, the second audio streaming component, and the at least one additional audio component with the at least one control function 512 — Display the at least one control function on a user interface End

FIG. 5

AUDIO STREAMING FUNCTION MANAGER

FIELD

The subject matter disclosed herein relates to a streaming audio system and more particularly relates to managing functions in a streaming audio system.

BACKGROUND

Audio streaming systems may include many different audio streaming devices or components. In a simple audio stream between two end users within a multistreaming system, multiple audio streaming devices may be coupled together. An audio streaming device in this chain may include its own switch or mechanism to control a particular function of the device (e.g., mute). Each audio device is typically not aware of the states of the other audio devices in the streaming chain at a given time, nor does a device notify the other devices in the chain when a function is executed on it causing it to change state. Problems in streaming the audio between the two end users may occur when a function or state of the audio device in the stream changes without alerting the rest of the devices in the chain. For example, if one or more devices in the chain is muted, the audio stream ceases to proceed further along the chain. The opposite end user simply does not know that a device in the chain has prevented the audio stream from reaching the opposite end user's device. There is no robust control over each of the individual the devices in the chain.

BRIEF SUMMARY

Apparatuses, methods, systems, and program products are disclosed for enabling user-defined and user-controlled management of streaming audio. An apparatus, in one embodiment, includes a processor, and coupled to the processor, a memory that stores code executable by the processor to enable a user to selectively conjoin at least one control function for a first audio streaming component and a second audio streaming component, and to enable the user to simultaneously control the first audio streaming component and the second audio streaming component with the at least one control function, and a user interface.

A method, in one embodiment, includes enabling a user to selectively conjoin at least one control function for a first audio streaming component and a second audio streaming component, enabling the user to simultaneously control the first audio streaming component and the second audio streaming component with the at least one control function, and displaying the at least one control function on a user interface.

A program product, in one embodiment, includes computer readable storage medium that stores code executable by a processor. In one embodiment, the code is executable by the processor to enable a user to selectively conjoin at least one control function for a first audio streaming component and a second audio streaming component; to simultaneously control the first audio streaming component and the second audio streaming component by the at least one control function; and to display the at least one control function on a user interface.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be limiting of scope, the embodiments will be described and explained with additional specificity and detail using the accompanying drawings, in which:

FIG. 5 is a schematic flow chart diagram illustrating one embodiment of another method for enabling user-defined and user-controlled management of streaming audio.

DETAILED DESCRIPTION

Figure 1:
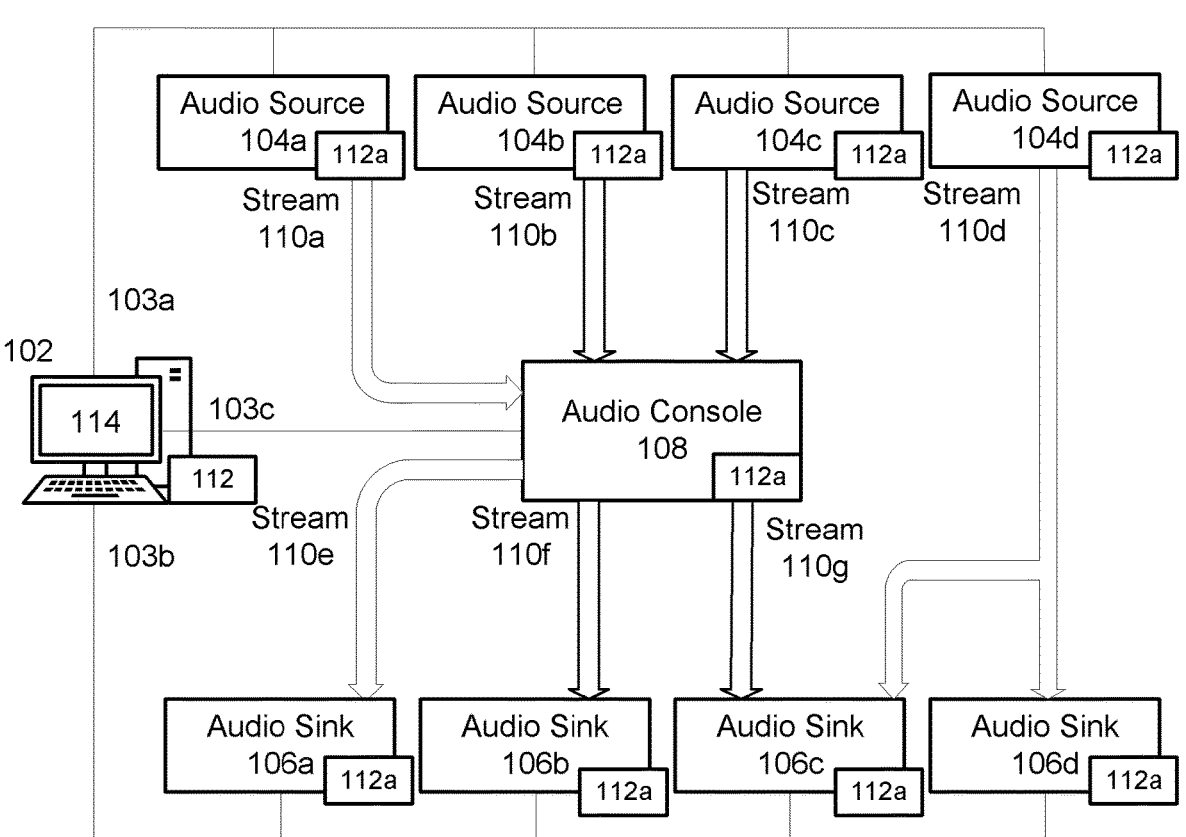
FIG. 1 is a schematic block diagram illustrating one embodiment of a system for enabling user-defined and user-controlled management of streaming audio.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The apparatuses, methods, systems, program products, and their respective embodiments disclosed herein enable user-defined and user-controlled management of streaming audio. The description of elements in each figure may refer to elements of proceeding figures. Like numbers refer to like elements in all figures, including alternate embodiments of like elements.

FIG. 1 is a schematic block diagram illustrating one embodiment of a system for enabling user-defined and user-controlled management of streaming audio. In one embodiment, the system 100 includes various audio streaming components. Audio streaming components include software, firmware, or hardware devices, which define, process, manipulate, manage, or otherwise control either digital or analog audio signals or perform functions on audio streams 110a-g. In this embodiment, the system includes audio streaming components including a computing device 102, audio sources 104a-d, audio sinks 106a-d, an audio console 108, and audio function modules 112 and/or 112a.

Even though system 100 of FIG. 1 depicts one configuration of a specific number of devices, including the computing device 102, the audio sources 104a-d, the audio sinks 106a-d, and the audio console 108, and a variety of the audio streams 110a-g, one of skill in the art will recognize that any number of computing devices 102, audio sources 104a-d, audio sinks 106a-d, audio consoles 108, and audio streams 110 may be included in the system 100 to achieve desired system goals. One of skill in the art will further recognize that the system 100 may be used for audio multistreaming, monostreaming, or a combination of both multistreaming and monostreaming.

The computing device 102 may include desktop computers, laptop computers, personal digital assistants (PDAs), tablet computers, smart phones, smart displays, vehicle on-board computers, or the like. In some embodiments, the computing device 102 may include a processor, and coupled to the processor, a memory that stores code executable by the processor to run various programs or applications and to perform various functions. The computing device 102 may further include a user interface 114 to enable the user to define, configure, control, and manage streaming audio functions.

In one embodiment, as shown, the computing device 102 is electronically coupled to the audio sources 104a-d by control and data lines 103a, to the sink sources 106a-d by control and data lines 103b, and to the audio console 108 via control and data lines 103c. These lines could also be implemented wirelessly and may be communicated over the Internet, various servers, and or global or local networks, including wired and wireless networks.

The computing device 102 may include an embodiment of the audio function module 112. In some embodiments, the computing device 102 may be an independent component from the audio function module 112, and in other embodiments, may be integrated to form a single unit. The computing device 102 may comprise various processors or processor cores, memory, storage, network connectivity chips, graphics chips, audio chips, and/or the like. The audio function module 112, in one embodiment, may be an independent module or may be an extension that adds to another computer program previously loaded on the computing device 102. The audio function module 112 may be stored within an app (e.g., Microsoft Teams). The computing device 102 may include one or more GUI elements 114 and the like to facilitate user interaction.

In one embodiment, audio sources 104a-d are used to produce and send audio signals and streams 110a-d. As an example, the audio source 104a may include a bezel mic or microphone, audio source 104b may include a first headset mic, audio source 104c may include a second headset mic, and audio source 104d may include a monitor mic. The audio source 104a provides the audio stream 110a to the audio console 108. The audio sources 104b-c respectively provide the discrete audio streams 110b-c to the audio console 108. The audio source 104d produces the audio stream 110d to audio sinks 106c-d.

The audio sources 104a-d may include any of various apparatuses, systems, devices, hardware, software, or other mechanisms capable of capturing or processing audio signals and may be located on many types of devices (e.g., microphones, cameras, mobile phones, recording devices, etc.). The audio sources 104a-d may produce audio streams 110a-d live or from prerecorded audio data. Throughout the process, the audio streams 110a-g may be encoded, decoded, converted to a digital or analog format, or combinations thereof for transmission and storage purposes and should be rendered in a human intelligible format upon replay for an end user.

In one embodiment, audio sinks 106a-d are used to receive or consume audio signals and streams 110d-g. As an example, the audio sink 106a may include a first VOIP application, audio sink 106b may include a game, audio source 106c may include a recording application, and audio source 106d may include a second VOIP application. The audio sink 106a receives the audio stream 110e from the audio console 108. The audio sink 106b receives the audio stream 110f from the audio console 108. The audio sink 106c receives the audio stream 110g from the audio console 108 and receives the audio stream 110d from the audio source 104d. And the audio sink 106d receives the audio stream 110d from the audio source 104d.

The audio console 108 may include various hardware, firmware, or software devices, such as an audio mixer, audio transformer, or the like. In a multistreaming embodiment, a mixer may be configured to mix several audio streams 110a-c. As shown in FIG. 1, the audio console 108 may include a mixer, which can be configured to mix the audio streams 110a-c and produce a mixed stream as streams 110e-g. Likewise, audio console 108 may include a transformer, which may be configured, for example, to adjust the volume of each of the audio streams 110a-c and output these adjustments as part of the mixed stream produced as streams 110e-g.

Computing device 102, as shown in FIG. 1, may also include the audio function module 112. The audio function module 112 enables user-defined and user-controlled management of streaming audio. The computing device 102 may be used by the system user for centralized configuration and control of the audio streaming components illustrated in FIG. 1. In some embodiments, the audio function module 112 may also include the audio function modules 112a, which may be integrated as part of each or all of the audio sources 104a-d, audio sinks 106a-d, and audio console 108.

In some embodiments, the computing device 102 and audio function module 112 include middleware (i.e., software between the operating system of the computing device 102 and a program or an application either running on the computing device 102 or running on another device within the system 100). Such middleware facilitates communication between the operating system and such applications and/or devices. For example, middleware might include drivers, which convert the hardware's analog operations to digital signals that the software of the computing device 102 can then understand and use consistent with a framework established by the operating system.

In some embodiments, the audio function module(s) 112(112a) may contain code executable by the processor to implement functions associated with audio streaming components (i.e., audio sources, sinks, processors, programs, etc.) and streams that are connected to the system 100. The audio function module(s) 112(112a) may begin by discovering all objects within the system 100 that are applicable (i.e., the audio streaming components and audio streams). If the audio function module(s) 112(112a) identifies an audio component or stream without an object or an inconsistent object, the audio function module(s) 112(112a) assigns a consistent object to standardize such discovered audio streaming component or stream of audio data to work within the framework of the computing device's operating system. In this manner, the discovered and standardized component, program, or audio stream can ultimately be independently controlled or managed by the centralized computing device 102. In other words, the user via the user interface 114 or program can consistently and independently define, selectively conjoin or configure groups of such audio streaming components or audio streams, and simultaneously control multiple audio streaming components and audio streams.

The audio function module(s) 112(112a) of system 100, in one embodiment, for example, might add the mute function to the audio sources and audio sinks if they do not already exist or interface with the existing mute controls on such audio components. The middleware may also be configured to discover system processors, such as mixers, transformers, or mixer-like objects and add mute controls if they do not exist or interface with existing mute controls. And the middleware may also be configured to discover audio streams and add mute controls if they do not exist or interface with existing mute controls. The middleware would then integrate these functions into the audio framework so that it knows all the audio components and audio streams that the system 100 is using and where it is sending the audio streams. Other middleware may add on/off controls to every audio stream in the system 100 and adapt as streams get sent to different locations in response to new user-defined configurations and/or device connections. The audio function module 112/112a are discussed in more detail regarding FIGS. 2-3.

The user interface 114 of the computing device 102 enables the user to configure each of the components within the system 100 and to set up the various links or connections between such components. The user interface 114 can be arranged in many ways according to the preference of the user or system designer. These may include drag and drop features, or a list format of components and their relationships to each other. The user interface may also include toggle switches, press and hold buttons to assert functions, or the like. Such switches, buttons, or the like may be implemented in logical or physical versions.

For simplification, FIG. 1 does not illustrate a network and servers, but one of skill in the art will readily understand that packetized audio streams in multistreaming configurations may be transmitted via one or more networks and may be stored or further processed on one or more servers. The data network, in one embodiment, includes a digital communication network that transmits digital communications. The data network may include a wireless network, such as a wireless cellular network, a local wireless network, such as a Wi-Fi network, a Bluetooth® network, a near-field communication ("NFC") network, an ad hoc network, and/or the like. The data network may include a WAN, a storage area network ("SAN"), a LAN, an optical fiber network, the internet, or other digital communication network. The data network may include two or more networks. The data network may include one or more servers, routers, switches, and/or other networking equipment. The data network may also include computer readable storage media, such as a hard disk drive, an optical drive, non-volatile memory, RAM, or the like.

In embodiments where the wireless connection is a mobile telephone/cellular network, the network may be configured as a 4G network, a 5G network, a long-term evolution ("LTE") based network, and/or the like. In such an embodiment, the mobile telephone network may create and manage wireless connections between base access units for the network and user equipment ("UE") devices for the user. The wireless connection may also employ a Wi-Fi network based on any one of the Institute of Electrical and Electronics Engineers ("IEEE") 802.11 standards.

The one or more servers may be embodied as blade servers, mainframe servers, tower servers, rack servers, and/or the like. The one or more servers may be configured as mail servers, web servers, application servers, FTP servers, media servers, data servers, web servers, file servers, virtual servers, and/or the like. The server, in one embodiment, may provide a portion or the entirety of a prerecorded audio stream to other audio streaming components (102, 104a-d, 106a-d, or 108) over the data network.

Figure 2:
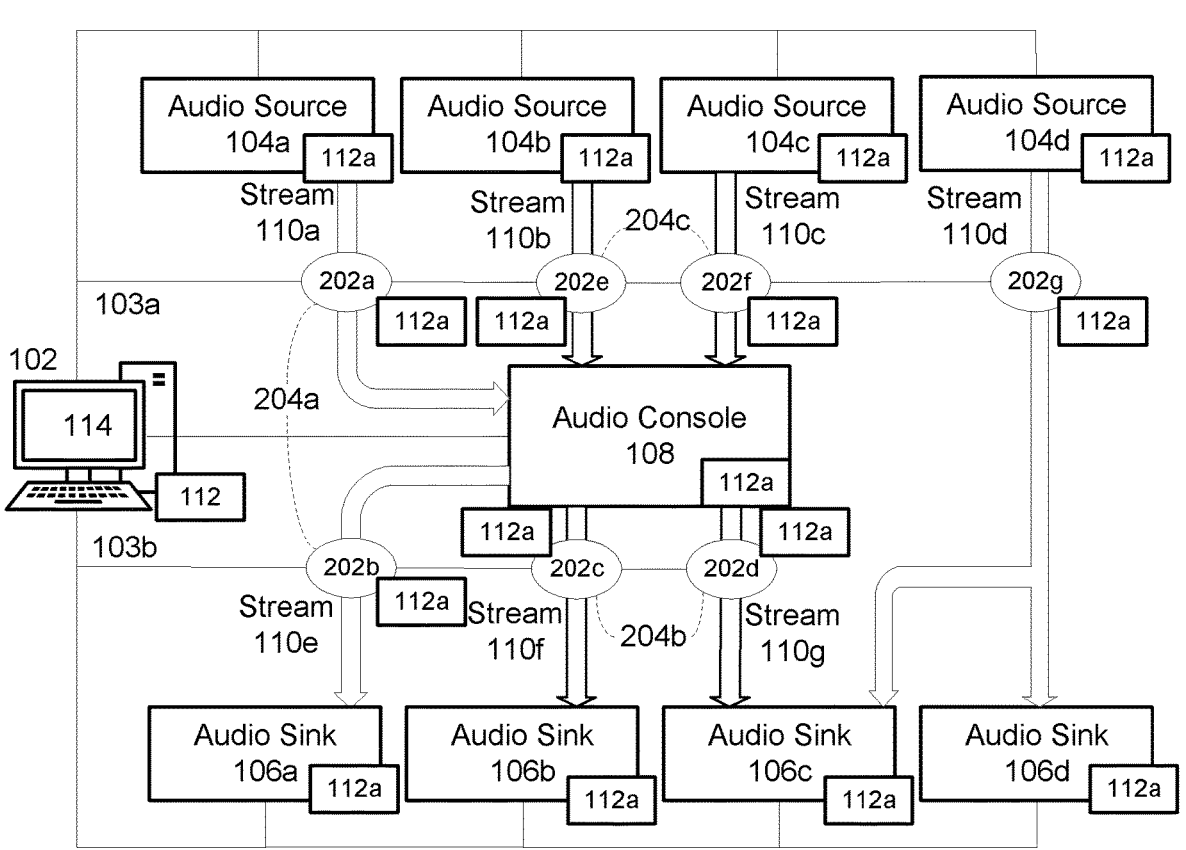
FIG. 2 is a schematic block diagram illustrating one embodiment of a system for enabling user-defined and user-controlled management of streaming audio.

FIG. 2 depicts one embodiment of a system 200 for enabling user-defined and user-controlled management of streaming audio. The description of elements in FIG. 2 may refer to elements of FIG. 1 and like numbers refer to like elements and these elements function according to the previous description of FIG. 1.

In one embodiment, system 200 includes stream interrupts 202a-g, which respectively interrupt the streams 110a-g upon which they are illustrated. Computing device also connects to each of these stream interrupts 202a-g via data and control lines (or wirelessly as discussed above) as illustrated. The stream interrupts 202a-g may include logical or physical mute functions, which may be controlled by audio function module(s) 112/112*a* as described regarding FIG. 1. As described herein, the user may configure these streams 110*a*-*g* to be independently, selectively, and simultaneously controlled using the user interface 114 of computing device 102. As mentioned regarding FIG. 1, this user-defined and user-controlled capability may include simultaneously applying one of various functions (e.g., mute, press-to-talk, or similar functions) to one or more streams 110*a*-*g*.

For example, a mute function may be simultaneously applied across one or more inputs to and one or more outputs from the audio console 108 in a serial mute structure as shown regarding stream 110*a* and stream 110*e*. This may be achieved in a few ways. For example, in a first instance, the audio function module(s) 112/112*a* can be configured to control interrupts 202*a* and 202*b* within the streams 110*a* and 110*e* to create a multi-stream mute control 204*a*. Likewise, in a second instance, the audio function module(s) 112/112*a* can be configured to control the output of audio source 104*a* and input of audio sink 106*a* to create the multi-stream mute control 204*a*. And, in a third instance, the audio function module(s) 112/112*a* can be configured to control the inputs and outputs of audio console 108 to block or unblock the incoming stream 110*a* and the outgoing stream 110*e* and create the multi-stream mute control 204*a*.

In these three instances, in effect by pressing a single toggle button, the user may mute or unmute both audio streams 110*a* and 110*e*. This may be implemented by applying basic logic arrangements (e.g., AND type logic function applied to both streams 110*a* and 110*e*) within the code of audio function module(s) 112/112*a*. A combination of these three examples may also achieve the same or a similar effect. These are just three examples for achieving a serial mute configuration.

In another example, stream 110*f* and stream 110*g* could likewise be simultaneously muted. For example, the mute function may be simultaneously applied across multiple outputs from the audio console 108 in a parallel mute structure to both stream 110*f* and stream 110*g*. This may also be achieved in a few ways. For example, in a first instance, the audio function module(s) 112/112*a* can be configured to control interrupts 202*c* and 202*d* to create a multi-stream mute control 204*b*. Likewise, in a second instance, the audio function module(s) 112/112*a* can be configured to control audio sink 106*b* and audio sink 106*c* to create the multi-stream mute control 204*b*. And, in a third instance, the audio function module(s) 112/112*a* can be configured to control the outputs of audio console 108 to block the outgoing streams 110*f* and 110*g* from leaving the audio console 108 and thus create the multi-stream mute control 204*b*.

In these three instances, again in effect by pressing a single toggle button, the user may mute or unmute both audio streams 110*f* and 110*g*. This may be implemented again by applying basic logic arrangements (e.g., AND type logic function applied to both streams 110*f* and 110*g*) within the code of audio function module(s) 112/112*a*. A combination of these three examples may also achieve the same or a similar effect. These are just three examples for achieving a parallel mute configuration.

In a third example, streams 110*b* and 110*c* could likewise be simultaneously controlled, or in this example, muted. For example, the mute function may be simultaneously applied across multiple inputs to the audio console 108 again in a parallel mute structure to both streams 110*b* and 110*c*. Similarly to the above example, this may also be achieved in a few ways. For example, in a first instance, the audio function module(s) 112/112*a* can be configured to control interrupts 202*e* and 202*f* to create a multi-stream mute control 204*c*. Likewise, in a second instance, the audio function module(s) 112/112*a* can be configured to control audio sources 104*b* and 104*c* to create the multi-stream mute control 204*c*. And, in a third instance, the audio function module(s) 112/112*a* can be configured to control the inputs of audio console 108 to block the incoming streams 110*b* and 110*c* from entering (or simply ignored by) the audio console 108 and thus create the multi-stream mute control 204*c*.

In these three instances, in effect, by pressing a single toggle button, the user may mute or unmute both audio streams 110*b* and 110*c*. This may be implemented again by applying basic logic arrangements (e.g., AND type logic function applied to both streams 110*b* and 110*c*) within the code of audio function module(s) 112/112*a*. A combination of these three examples may also achieve the same or a similar effect. These are just three examples for achieving a parallel mute configuration to multiple source streams.

In a fourth example, streams 110*b* and 110*c* could likewise be simultaneously controlled for other types of advantages. For example, in one embodiment the code is executable by the audio function module(s) 112/112*a* to prioritize activation of one of a set of hot-pluggable audio streaming components. Audio source 104*b* may include a first headset mic (having a lower priority) and audio source 104*c* may include a second headset mic (having a higher priority). If both are competing for a single available connection, rather than applying the mute function and the AND type logic function as discussed in the above embodiment, an XOR type logic arrangement could be used to control the prioritization of activation between the multiple audio sources 104*b* and 104*c*. As in the above examples, this effect may also be achieved in a few ways or at several control points. For example, in a first instance, the audio function module(s) 112/112*a* can be configured to control interrupts 202*e* and 202*f* to create a multi-stream priority control 204*c*. Likewise, in a second instance, the audio function module(s) 112/112*a* can be configured to control audio sources 104*b* and 104*c* to create the multi-stream priority control 204*c*. And, in a third instance, the audio function module(s) 112/112*a* can be configured to control the inputs of audio console 108 to prioritize which of the incoming streams 110*b* and 110*c* is received by (or ignore the lower priority audio source 104*b*) the audio console 108 and thus create the multi-stream priority control 204*c*.

In yet another embodiment, audio function module(s) 112/112*a* can be configured to control a push-to-talk function in multiple ways. In this example, the user may push and hold a button to allow the audio stream 110*d* to pass from audio source 104*d* to audio sinks 106*c* and 106*d*. Again, audio function module(s) 112/112*a* can be configured to control this function at one of three points shown in FIG. 2. For example, audio function module(s) 112/112*a* can be configured to control interrupt 202*g*, the output of audio source 104*d*, or the inputs to audio sinks 106*c* and 106*d* in a similar manner to the examples above.

These examples should provide one of skill in the art adequate information to understand that different configurations and logic arrangements may allow for user-defined and selected streams to pass through while others are blocked. These examples provide only a few of the possible combinations. There are many ways to implement audio functions. The result is that the user may configure the system in any desired arrangement to have full control over each audio streaming component and each audio stream within the system.

Figure 3:
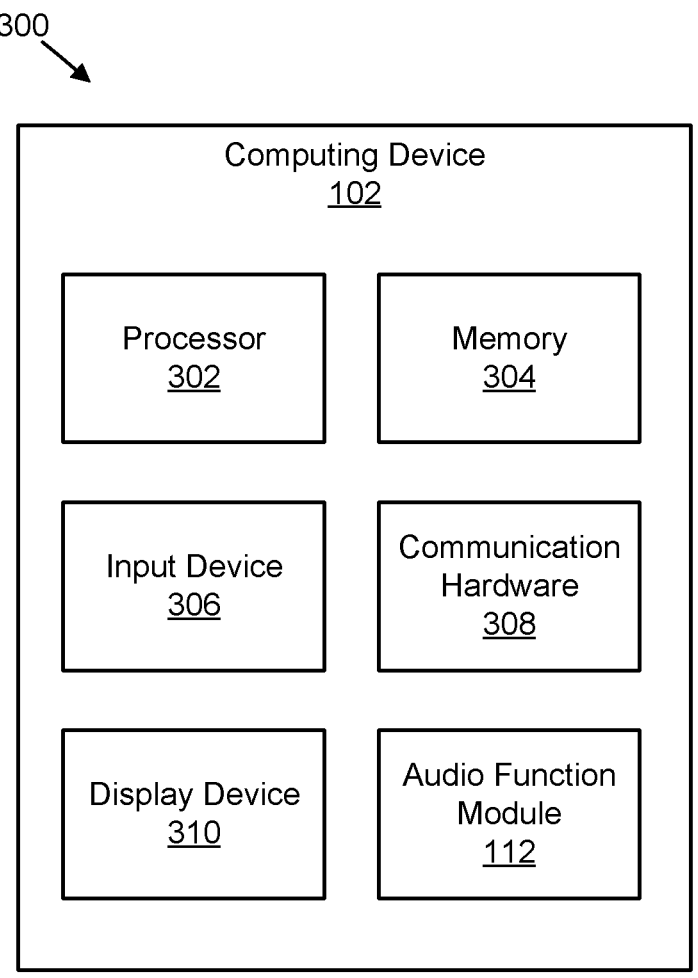
FIG. 3 is a schematic block diagram illustrating one embodiment of an apparatus including an audio streaming component.

FIG. 3 depicts one embodiment of an apparatus 300 for enabling user-defined and user-controlled management of streaming audio. The apparatus 300 includes one embodiment of the computing device 102. The computing device 102 may include a processor 302, a memory 304, an input device 306, communication hardware 308, a display device 310, and the audio function module 112. In some embodiments, the input device 306 and the display device 310 are combined into a single device, such as a touchscreen. Although the apparatus 300 depicts the computing device 102 including a specific number of processors 302, memories 304, input devices 306, communication hardware 308, display devices 310, and audio function modules 112, one of skill in the art will recognize that any number of processors 302, memories 304, input devices 306, communication hardware 308, display devices 310, and audio function modules 112 may be included in the computing device 102.

The processor 302, in one embodiment, may include any known controller capable of executing computer-readable instructions and/or capable of performing logical operations. For example, the processor 302 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 302 executes instructions stored in the memory 304 to perform the methods and routines described herein. The processor 302 is communicatively coupled to the memory 304, the input device 306, the communication hardware 308, the display device 310, and the audio function module 112.

The memory 304, in one embodiment, is a computer readable storage medium. In some embodiments, the memory 304 includes volatile computer storage media. For example, the memory 304 may include a RAM, including dynamic RAM ("DRAM"), synchronous dynamic RAM ("SDRAM"), and/or static RAM ("SRAM"). In some embodiments, the memory 304 includes non-volatile computer storage media. For example, the memory 304 may include NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like. In some embodiments, the memory 304 includes both volatile and non-volatile computer storage media.

In some embodiments, the memory 304 stores data and/or metadata relating to enabling user-defined and user-controlled management of streaming audio. In some embodiments, the memory 304 also stores program code and related data, such as an operating system or other middleware or controller algorithms operating on the computing device 102.

The input device 306, in one embodiment, may include any known computer input device including a touch panel, a button, a keyboard, a stylus, or the like. In some embodiments, the input device 306 may be integrated with the display device 310, for example, as a touchscreen or similar touch-sensitive display. In some embodiments, the input device 306 includes a touchscreen such that user input, including desired grouping of audio streaming components or connections between the same may be input using a virtual keyboard or mouse displayed on the touchscreen and/or by touching on the touchscreen. In one embodiment, the input device 306 includes voice recognition software to record the user input into the user interface 114. In some embodiments, the input device 306 includes two or more different devices, such as a keyboard and a touch panel.

The communication hardware 308 may facilitate communication with other devices. For example, the communication hardware 308 may enable communication via Bluetooth®, Wi-Fi, WAN, and so forth. The wireless connection may also employ a Wi-Fi network based on any one of the Institute of Electrical and Electronics Engineers ("IEEE") 802.11 standards. In some embodiments, the communication hardware 308 may enable communication with the server (not shown).

The display device 310, in one embodiment, may include any known electronically controllable display or display device. The display device 310 may be designed to portray visual data (e.g., existing audio streaming component configurations) or make adjustments via the user interface 114. For example, the display device 310 may include, but is not limited to, an LCD display, an LED display, an OLED display, a projector, or similar display device capable of outputting communicative input to the user. As another, non-limiting, example, the display device 310 may include a wearable display such as a smart watch, smart glasses, a heads-up display, or the like. Further, the display device 310 may be a component of a smart phone, a personal digital assistant, a television, a table computer, a notebook (laptop) computer, a personal computer, a vehicle dashboard, a streaming device, or the like.

In certain embodiments, the display device 310 includes one or more speakers for producing sound. For example, the display device 310 may produce an audible alert or notification (e.g., a beep or chime). In some embodiments, the display device 310 includes one or more haptic devices for producing vibrations, motion, or other haptic feedback. For example, the display device 310 may produce haptic feedback upon performing an action, such as making a connection between audio streaming components.

In some embodiments, all or portions of the display device 310 may be integrated with the input device 306. For example, the input device 306 and display device 310 may form a touchscreen or similar touch-sensitive display. In other embodiments, the display device 310 may be located near the input device 306. In certain embodiments, the display device 310 may receive instructions and/or data for output from the processor 302 and/or the audio function module 112.

The audio function module 112 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the computing device 102 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the computing device 102.

The computing device 102 may use the audio function module 112 for enabling user-defined and user-controlled management of streaming audio such as those already described regarding FIGS. 1 and 2. As may be appreciated, the audio function module 112 may include computer hardware, firmware, or software, or a combination of these.

Figure 4:
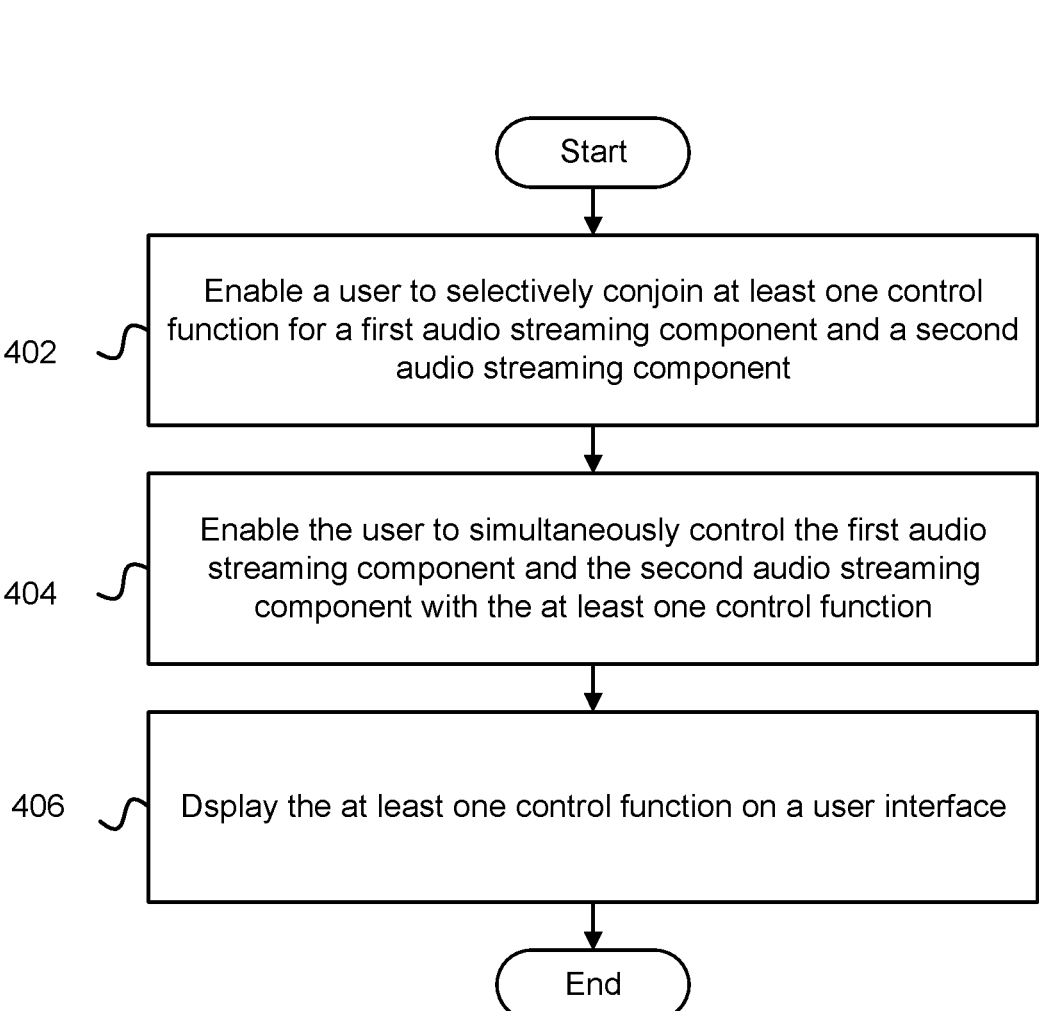
FIG. 4 is a schematic flow chart diagram illustrating one embodiment of a method for enabling user-defined and user-controlled management of streaming audio.

FIG. 4 is a schematic flow chart diagram illustrating an embodiment of a method 400 for enabling user-defined and user-controlled management of streaming audio. In some embodiments, the method 400 is performed by an apparatus, such as the computing device 102. In other embodiments, the method 400 may be performed by a module, such as the audio function module 112. In some embodiments, the method 400 may be performed by distributed modules 112*a*. In some embodiments, the method 400 may be performed by the audio function module 112 working in conjunction with audio function modules 112*a*. In certain embodiments, the method 400 may be performed by a processor executing program code, for example, a microcontroller, a microprocessor, a CPU, a GPU, an auxiliary processing unit, a FPGA, or the like.

In one embodiment, the method 400 begins and enables a user to selectively conjoin 402, by processor, at least one control function for a first audio streaming component and a second audio streaming component. The method 400 continues and enables the user to simultaneously control 404 the first audio streaming component and the second audio streaming component with the at least one control function. The method 400 continues and displays 406 the at least one control function on a user interface.

In some embodiments, the method 400 may continue and discover at least one additional audio component. In one embodiment, the method 400 may continue and assign an object to the at least one additional audio component. In one embodiment, the at least one additional audio component is an audio console.

In one embodiment, the method 400 may continue and enable the user to selectively conjoin the at least one control function to include the audio console along with the first audio streaming component and the second audio streaming component; and to simultaneously control the first audio streaming component, the second audio streaming component, and the audio console with the at least one control function. In one embodiment, the at least one control function is mute. In one embodiment, the at least one control function is push-to-talk. In one embodiment, the method 400 may continue and prioritize activation of one of a set of hot-pluggable audio streaming components.

FIG. 5 is a schematic flow chart diagram illustrating an embodiment of a method 500 for enabling user-defined and user-controlled management of streaming audio. In some embodiments, the method 500 is performed by an apparatus, such as the computing device 102. In other embodiments, the method 500 may be performed by a module, such as the audio function module 112. In some embodiments, the method 500 may be performed by distributed modules 112*a*. In some embodiments, the method 500 may be performed by the audio function module 112 working in conjunction with audio function modules 112*a*. In certain embodiments, the method 500 may be performed by a processor executing program code, for example, a microcontroller, a microprocessor, a CPU, a GPU, an auxiliary processing unit, a FPGA, or the like.

In one embodiment, the method 500 begins and enables a user to selectively conjoin 502, by processor, at least one control function for a first audio streaming component and a second audio streaming component. The method 500 continues and enables the user to simultaneously control 504 the first audio streaming component and the second audio streaming component with the at least one control function. The method 500 continues and discovers 506 at least one additional audio component. The method 500 continues and assigns 508 an object to the at least one additional audio component, which may be an audio console such as an audio mixer, a transformer, or the like. The method 500 continues and enables the user to selectively conjoin the at least one control function to include the at least one additional audio component (e.g., audio console) 510 along with the first audio streaming component and the second audio streaming component, and to simultaneously control the first audio streaming component, the second audio streaming component, and the audio console with the at least one control function. The method 500 continues and displays 512 the at least one control function on a user interface.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory, coupled to the processor, that stores code executable by the processor to:
    enable a user to selectively conjoin, via an audio console, at least a parallel mute function for at least a first audio streaming component and a second audio streaming component of a plurality of audio streaming components,
    enable the user to simultaneously apply the parallel mute function to the first audio streaming component and the second audio streaming component, wherein simultaneously applying the parallel mute function includes simultaneously controlling:
        at least one of a first interrupt in a first input to the audio console and associated with the first audio streaming component or a second interrupt in a first output from the audio console and associated with the first audio streaming component, and
        at least one of a third interrupt in a second input to the audio console and associated with the second audio streaming component or and a fourth interrupt in a second output from the audio console and associated with the second audio streaming component, and
    a user interface configured to display at least the parallel mute function.

2. The apparatus of claim 1, wherein:
the first audio streaming component comprises an audio source;
the second audio streaming component comprises an audio sink; and
simultaneously applying the parallel mute function comprises simultaneously controlling the first interrupt and the second interrupt to serially mute the audio source.

3. The apparatus of claim 1, wherein:
the first audio streaming component comprises a first audio sink;
the second audio streaming component comprises a second audio sink; and

simultaneously applying the parallel mute function includes simultaneously controlling the second interrupt and the fourth interrupt to mute an audio source.

4. The apparatus of claim 1, wherein:
the first audio streaming component comprises a first audio source;
the second audio streaming component comprises a second audio source; and
simultaneously applying the parallel mute function includes simultaneously controlling the first interrupt and the third interrupt to mute the first audio source and the second audio source.

5. The apparatus of claim 1, wherein the stored code is further executable by the processor to:
enable the user to selectively conjoin a mute function for at least a third audio streaming component and a fourth audio streaming component of the plurality of audio streaming components; and
enable the user to simultaneously control the third audio streaming component and the fourth audio streaming component with the mute function.

6. The apparatus of claim 5, wherein:
the third audio streaming component and the fourth audio streaming component comprise a set of hot-pluggable audio streaming components; and
the code is executable by the processor to prioritize activation of one of the third audio streaming component or the fourth audio streaming component.

7. The apparatus of claim 5, wherein the code is executable by the processor to:
discover at least a fifth audio component and a sixth audio component; and
enable a push-to-talk function for the fifth audio component and the sixth audio component.

8. A method, comprising:
enabling a user to selectively conjoin, via an audio console, at least a parallel mute function for at least a first audio streaming component and a second audio streaming component of a plurality of audio streaming components;
enabling the user to simultaneously apply the parallel mute function to the first audio streaming component and the second audio streaming component, and
wherein simultaneously applying the parallel mute function includes simultaneously controlling:
at least one of a first interrupt in a first input to the audio console and associated with the first audio streaming component or a second interrupt in a first output from the audio console and associated with the first audio streaming component, and
at least one of a third interrupt in a second input to the audio console and associated with the second audio streaming component or a fourth interrupt in a second output from the audio console associated with the second audio streaming component; and
displaying at least the parallel mute function on a user interface.

9. The method of claim 8, wherein:
the first audio streaming component comprises an audio source;
the second audio streaming component comprises an audio sink; and
simultaneously applying the parallel mute function comprises simultaneously controlling the first interrupt and the second interrupt to serially mute the audio source.

10. The method of claim 8, wherein:
the first audio streaming component comprises a first audio sink;
the second audio streaming component comprises a second audio sink; and
simultaneously applying the parallel mute function includes simultaneously controlling the second interrupt and the fourth interrupt to mute an audio source.

11. The method of claim 8, wherein:
the first audio streaming component comprises a first audio source;
the second audio streaming component comprises a second audio source; and
simultaneously applying the parallel mute function includes simultaneously controlling the first interrupt and the third interrupt to mute the first audio source and the second audio source.

12. The method of claim 8, further comprising:
enabling the user to selectively conjoin a mute function for at least a third audio streaming component and a fourth audio streaming component of the plurality of audio streaming components; and
enabling the user to simultaneously control the third audio streaming component and the fourth audio streaming component with the mute function.

13. The method of claim 12, further comprising:
discovering at least a fifth audio component and a sixth audio component; and
enabling a push-to-talk function for the fifth audio component and the sixth audio component.

14. The method of claim 12, wherein:
the third audio streaming component and the fourth audio streaming component comprise a set of hot-pluggable audio streaming components; and
the method further comprises prioritizing activation of one of the third audio streaming component or the fourth audio streaming component.

15. A program product comprising a non-transitory computer-readable storage medium that stores code executable by a processor, the executable code comprising code to:
enable a user to selectively conjoin, via an audio console, at least a parallel mute function for at least a first audio streaming component and a second audio streaming component of a plurality of audio streaming components;
enable the user to simultaneously apply the parallel mute function to the first audio streaming component and the second audio streaming component, wherein simultaneously applying the parallel mute function includes simultaneously controlling:
at least one of a first interrupt in a first input to the audio console and associated with the first audio streaming component or a second interrupt in a first output from the audio console and associated with the first audio streaming component, and
at least one of a third interrupt in a second input to the audio console and associated with the second audio streaming component or a fourth interrupt in a second output from the audio console and associated with the second audio streaming component; and
display at least the parallel mute function on a user interface.

16. The program product of claim 15, wherein:
the first audio streaming component comprises an audio source;
the second audio streaming component comprises an audio sink; and simultaneously applying the parallel mute function comprises simultaneously controlling the first interrupt and the second interrupt to serially mute the audio source.

17. The program product of claim 15, wherein:

the first audio streaming component comprises a first audio sink;

the second audio streaming component comprises a second audio sink; and simultaneously applying the parallel mute function includes simultaneously controlling the second interrupt and the fourth interrupt to mute an audio source.

18. The program product of claim 15, wherein:

the first audio streaming component comprises a first audio source;

the second audio streaming component comprises a second audio source; and simultaneously applying the parallel mute function includes simultaneously controlling the first interrupt and the third interrupt to mute the first audio source and the second audio source.

19. The program product of claim 15, wherein the executable code further comprises code to:

enable the user to selectively conjoin a mute function for at least a third audio streaming component and a fourth audio streaming component of the plurality of audio streaming components; and enable the user to simultaneously control the third audio streaming component and the fourth audio streaming component with the mute function.

20. The program product of claim 19, wherein the executable code further comprises code to:

enable the user to selectively conjoin the mute function to include the audio console along with the third audio streaming component and the fourth audio streaming component; and enable the user to simultaneously control the third audio streaming component, the fourth audio streaming component, and the audio console with the mute function.

\* \* \* \* \*